US009229288B2

(12) United States Patent
Miura

(10) Patent No.: US 9,229,288 B2
(45) Date of Patent: Jan. 5, 2016

(54) DISPLAY PANEL IN WHICH TWO WIRING LINES OF THE SAME TYPE HAVE DIFFERENT THICKNESS DIRECTION LAYOUTS

(71) Applicant: JOLED Inc., Tokyo (JP)

(72) Inventor: Kiwamu Miura, Kanagawa (JP)

(73) Assignee: JOLED Inc., Tokyo (JP)

(*) Notice: Subject to any disclaimer, the term of this patent is extended or adjusted under 35 U.S.C. 154(b) by 90 days.

(21) Appl. No.: 13/657,397

(22) Filed: Oct. 22, 2012

(65) Prior Publication Data

US 2013/0106812 A1    May 2, 2013

(30) Foreign Application Priority Data

Oct. 28, 2011 (JP) .................. 2011-237487

(51) Int. Cl.
*G09G 3/32* (2006.01)
*G02F 1/1362* (2006.01)

(52) U.S. Cl.
CPC ........ *G02F 1/136286* (2013.01); *G09G 3/3258* (2013.01); *G09G 2300/0426* (2013.01); *G09G 2310/0251* (2013.01); *G09G 2320/0219* (2013.01)

(58) Field of Classification Search
CPC .................................................. G09G 3/3258
USPC ............................................................ 345/82
See application file for complete search history.

(56) References Cited

U.S. PATENT DOCUMENTS

| 2008/0029768 | A1* | 2/2008 | Asano et al. ........... 257/72 |
| 2010/0085281 | A1* | 4/2010 | Yokota ................... 345/76 |
| 2012/0086734 | A1* | 4/2012 | Kitani et al. .......... 345/690 |
| 2012/0138963 | A1* | 6/2012 | Tseng et al. ............ 257/88 |

FOREIGN PATENT DOCUMENTS

JP    2008-033091 A    2/2008

* cited by examiner

*Primary Examiner* — Long D Pham
(74) *Attorney, Agent, or Firm* — Michael Best & Friedrich LLP

(57) ABSTRACT

A display panel includes: a plurality of first wirings extending in a row direction; a plurality of second wirings extending in a column direction; and a plurality of pixels each arranged in proximity to an intersection of each of the first wirings and each of the second wirings. Two wirings of the plurality of first wirings or two wirings of the plurality of second wirings are disposed in a common region interposed between two pixels next to each other, and layouts of the respective two wirings in a thickness direction are different from each other at least in a part of each of the layouts.

14 Claims, 13 Drawing Sheets

ROW DIRECTION

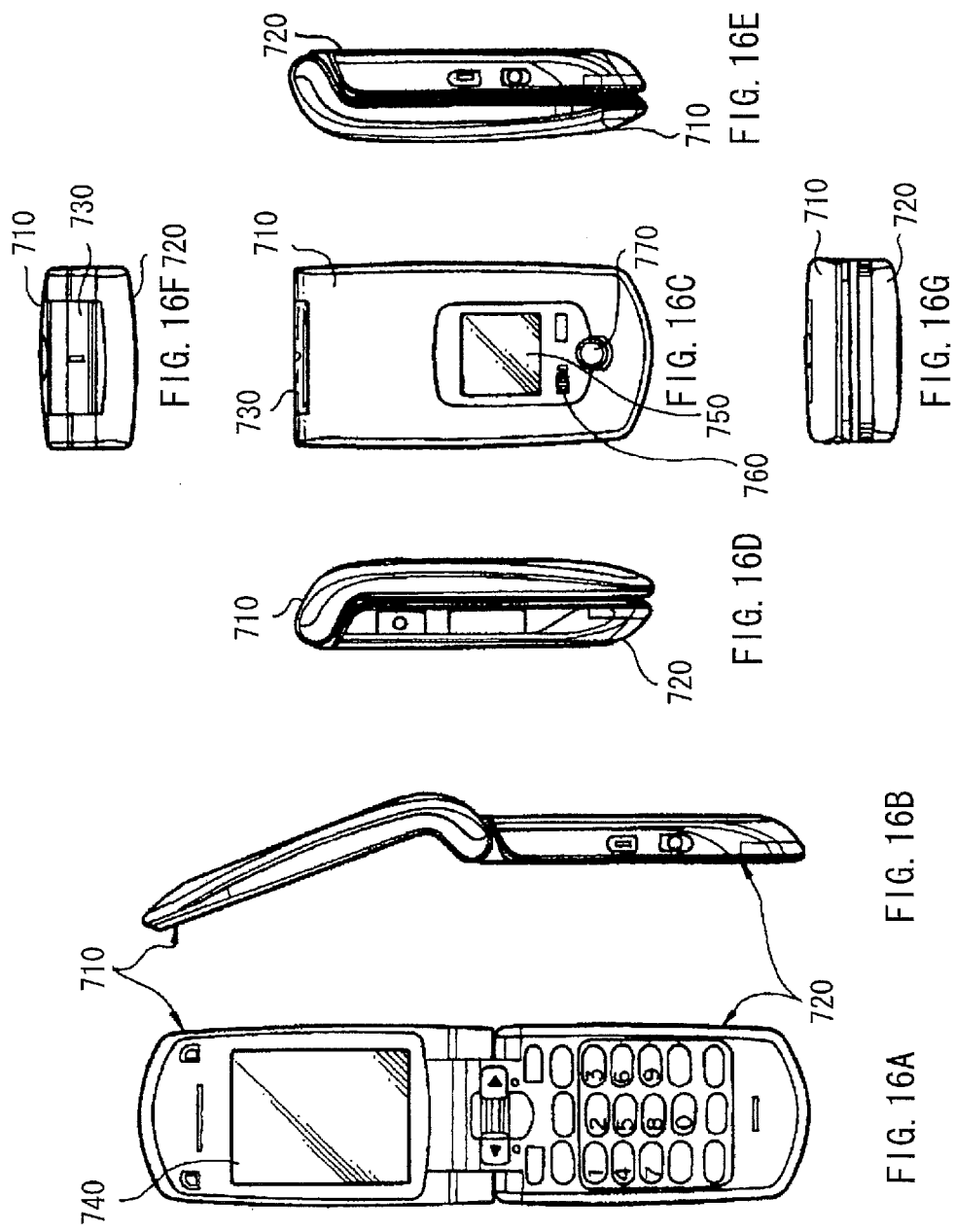

DISPLAY PANEL IN WHICH TWO WIRING LINES OF THE SAME TYPE HAVE DIFFERENT THICKNESS DIRECTION LAYOUTS

BACKGROUND

The technology relates to a display panel suitable for use in which a high-definition resolution is desired, and a display unit with the display panel. The technology also relates to an electronic unit provided with the display unit.

In the field of display units which display images, display units using a current-driven type optical device as a light-emission device of a pixel have been developed and commercialized in recent years. In the current-driven type optical device, light emission intensity varies depending on the value of a flowing current. Examples of the current-driven type optical device include an organic electro luminescence (EL) device. The organic EL device is a self-luminous device, unlike a liquid crystal device and the like. Therefore, in the display unit using the organic EL device (i.e., an organic EL display unit), a light source (a backlight) is unnecessary and thus, it is possible to reduce a thickness and increase a luminance, as compared with a liquid crystal display unit in which a light source is necessary. In particular, when an active matrix system is used as a drive system, it is possible to light and hold each pixel, which enables a reduction in power consumption. Therefore, the organic EL display unit is expected to be the mainstream in the next generation of flat-panel displays.

In the display unit of the active matrix type, a current flowing in the organic EL device provided for each pixel is controlled by a thin-film transistor (TFT) which is disposed in a pixel circuit provided for each of the organic EL devices (see Japanese Unexamined Patent Application Publication No. 2008-33091).

SUMMARY

Meanwhile, pixel circuits may be in a mirror-image arrangement from the viewpoint of yield improvement (see Japanese Unexamined Patent Application Publication No. 2008-33091). In the high-definition display panel, however, this arrangement reduces pixel spacing, which makes it difficult to ignore a parasitic capacitance between wirings next to each other. In this case, the parasitic capacitance between the wirings next to each other leads to disadvantages such as degradation in display quality and an increase in power consumption.

It is desirable to provide a display panel, a display unit, and an electronic unit, which are capable of reducing a parasitic capacitance between wirings next to each other.

According to an embodiment of the technology, there is provided a display panel including: a plurality of first wirings extending in a row direction; a plurality of second wirings extending in a column direction; and a plurality of pixels each arranged in proximity to an intersection of each of the first wirings and each of the second wirings. Two wirings of the plurality of first wirings or two wirings of the plurality of second wirings are disposed in a common region interposed between two pixels next to each other, and layouts of the respective two wirings in a thickness direction are different from each other at least in a part of each of the layouts.

According to an embodiment of the technology, there is provided a display unit including: a display panel including a plurality of first wirings extending in a row direction, a plurality of second wirings extending in a column direction, and a plurality of pixels each arranged in proximity to an intersection of each of the first wirings and each of the second wirings; and a drive circuit driving each of the pixels through the plurality of first wirings and the plurality of second wirings. Two wirings of the plurality of first wirings or two wirings of the plurality of second wirings are disposed in a common region interposed between two pixels next to each other, and layouts of the respective two wirings in a thickness direction are different from each other at least in a part of each of the layouts.

According to an embodiment of the technology, there is provided an electronic unit including a display unit. The display unit including: a display panel including a plurality of first wirings extending in a row direction, a plurality of second wirings extending in a column direction, and a plurality of pixels each arranged in proximity to an intersection of each of the first wirings and each of the second wirings; and a drive circuit driving each of the pixels through the plurality of first wirings and the plurality of second wirings. Two wirings of the plurality of first wirings or two wirings of the plurality of second wirings are disposed in a common region interposed between two pixels next to each other, and layouts of the respective two wirings in a thickness direction are different from each other at least in a part of each of the layouts.

In the display panel, the display unit, and the electronic unit according to the above-described embodiments of the technology, the layouts of the respective two wirings next to each other, the layouts being in the thickness direction, are different from each other at least in a part of each thereof. Thus, a distance between the wirings is increased at least in a part of each thereof, as compared with a case where two wirings interposed between two pixels next to each other are disposed in the same layer, for instance.

According to the display panel, the display unit, and the electronic unit in the above-described embodiments of the technology, the layouts of the respective two wirings next to each other, the layouts being in the thickness direction, are different from each other at least in a part of each thereof. Therefore, a parasitic capacitance between the wirings next to each other is allowed to be reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 16A to 16G are views of an application example 5, namely, a front view in an open state, a side view in the open state, a front view in a closed state, a left-side view, a right-side view, a top view, and a bottom view, respectively.

DETAILED DESCRIPTION

An embodiment will be described below in detail with reference to the drawings. It is to be noted that the description will be provided in the following order.
1. Embodiment (a display unit)
   An example in which two signal lines are next to each other
2. Application examples (electronic units)
   Examples in each of which the display unit of the embodiment is applied to an electronic unit 1. Embodiment

Figure 1:
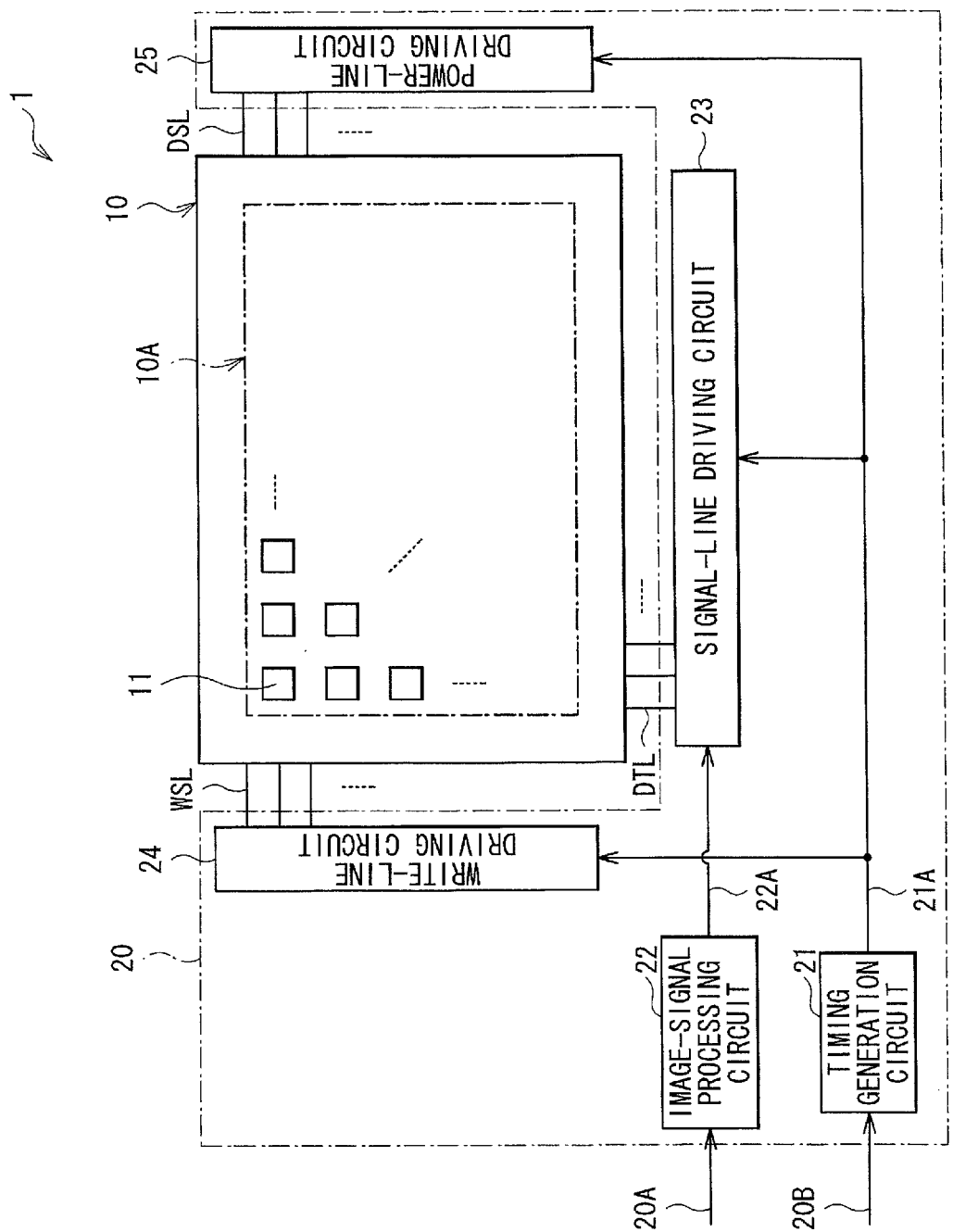
FIG. 1 is a diagram illustrating an example of a configuration of a display unit according to an embodiment of the technology.

[Configuration]
FIG. 1 illustrates a schematic configuration of a display unit 1 according to an embodiment of the technology. This display unit 1 includes a display panel 10 and a drive circuit 20 driving the display panel 10. The drive circuit 20 includes, for example, a timing generation circuit 21, an image-signal processing circuit 22, a signal-line driving circuit 23, a write-line driving circuit 24, and a power-line driving circuit 25.
(Display Panel 10)
In the display panel 10, a plurality of pixels 11 are two-dimensionally arranged over the entire surface in a display region 10A of the display panel 10. Each of the pixels 11 corresponds to a point, which is a minimum unit, of a screen on the display panel 10. When the display panel 10 is a color display panel, the pixel 11 is equivalent to a subpixel that emits light of a single color such as red, green, and blue. When the display panel 10 is a monochrome display panel, the pixel 11 is equivalent to a pixel that emits white light.

Figure 2:
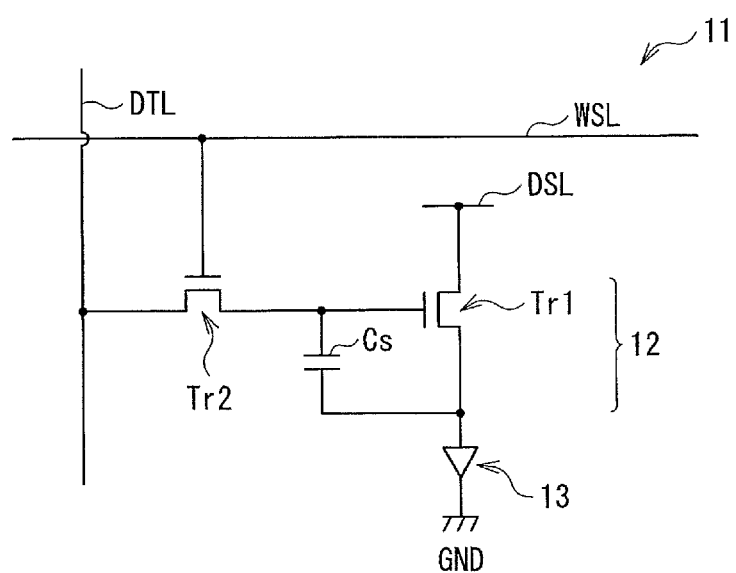
FIG. 2 is a diagram illustrating an example of a configuration of a pixel.

The display panel 10 displays an image based on an image signal 20A inputted from outside, when each of the pixels 11 is subjected to active matrix driving by the drive circuit 20. FIG. 2 illustrates an example of a circuit configuration of the pixel 11. The pixel 11 includes, for example, a pixel circuit 12 and an organic EL device 13 as illustrated in FIG. 2. The organic EL device 13 has, for example, a configuration in which an anode electrode, an organic layer, and a cathode electrode are layered in order.

As illustrated in FIG. 2, the pixel circuit 12 is configured to include, for example, a drive transistor Tr1, a write transistor Tr2, and a retention capacitor Cs. In other words, the pixel circuit 12 has a circuit configuration of 2Tr1C. The write transistor Tr2 samples a voltage of a signal line DTL described later, and writes the voltage to a gate of the drive transistor Tr1. The drive transistor Tr1 controls a current flowing in the organic EL device 13 according to the magnitude of the voltage written by the write transistor Tr2. The retention capacitor Cs maintains a predetermined voltage between the gate and a source of the drive transistor Tr1. It is to be noted that the pixel circuit 12 may have a circuit configuration different from the above-mentioned circuit configuration of 2Tr1C.

Each of the drive transistor Tr1 and the write transistor Tr2 is formed of, for example, a thin-film transistor (TFT) of an n-channel MOS type. It is to be noted that the type of the TFT is not limited in particular, and may be, for example, in an inverted staggered structure (a bottom-gate type) or in a staggered structure (a top-gate type). Further, the drive transistor Tr1 or the write transistor Tr2 may be a TFT of a p-channel MOS type.

As illustrated in FIG. 2, the display panel 10 has a plurality of write lines WSL extending in a row direction, a plurality of signal lines DTL extending in a column direction, and a plurality of power lines DSL extending in the row direction. In proximity to an intersection of each of the signal lines DTL and each of the write lines WSL, the pixel 11 is provided. Each of the signal lines DTL is connected to an output terminal (not illustrated) of the signal-line driving circuit 23, and a source or a drain of the write transistor Tr2 described later. Each of the write lines WSL is connected to an output terminal (not illustrated) of the write-line driving circuit 24 described later, and a gate of the write transistor Tr2. Each of the power lines DSL is connected to an output terminal of a power supply (not illustrated) outputting a fixed voltage, and the source or a drain of the drive transistor Tr1.

The gate of the write transistor Tr2 is connected to the write line WSL. The source or the drain of the write transistor Tr2 is connected to the signal line DTL. Of the source and the drain of the write transistor Tr2, a terminal which is not connected to the signal line DTL is connected to the gate of the drive transistor Tr1. The source or the drain of the drive transistor Tr1 is connected to the power line DSL. Of the source and the drain of the drive transistor Tr1, a terminal which is not connected to the power line DSL is connected to an anode of the organic EL device 13. One end of the retention capacitor Cs is connected to the gate of the drive transistor Tr1, and the other end of the retention capacitor Cs is connected to the source of the drive transistor Tr1 (i.e. a terminal on the organic EL device 13 side in FIG. 2). In other words, the retention capacitor Cs is inserted between the gate and the source of the drive transistor Tr1. A cathode of the organic EL device 13 is connected to a ground Line GND. The ground Line GND is electrically connected to an external circuit (not illustrated) at a base potential (e.g., a ground potential).

(Layout in Display Panel 10)

Figure 3:
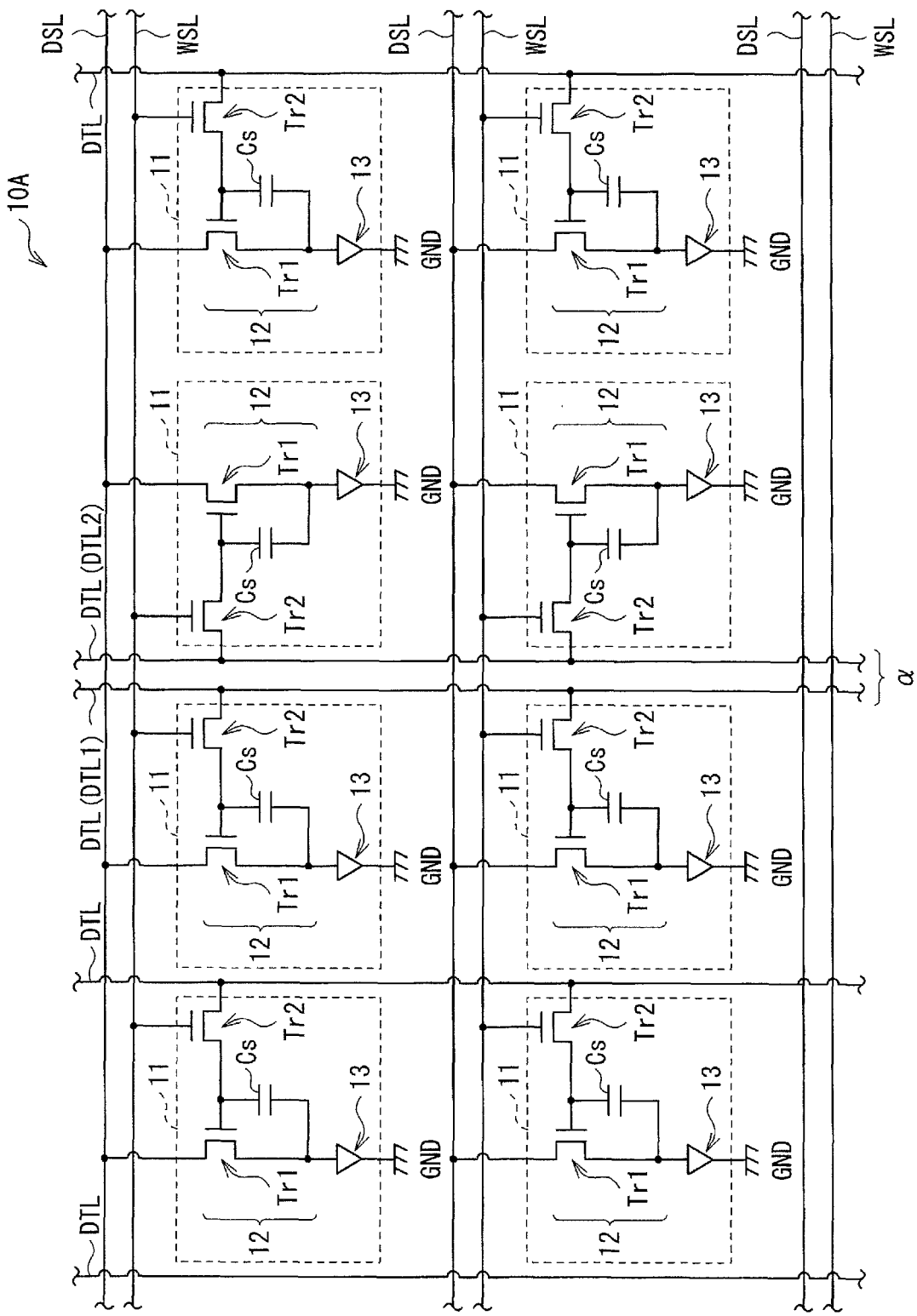
FIG. 3 is a diagram illustrating a layout example in a display region.
Figure 4:
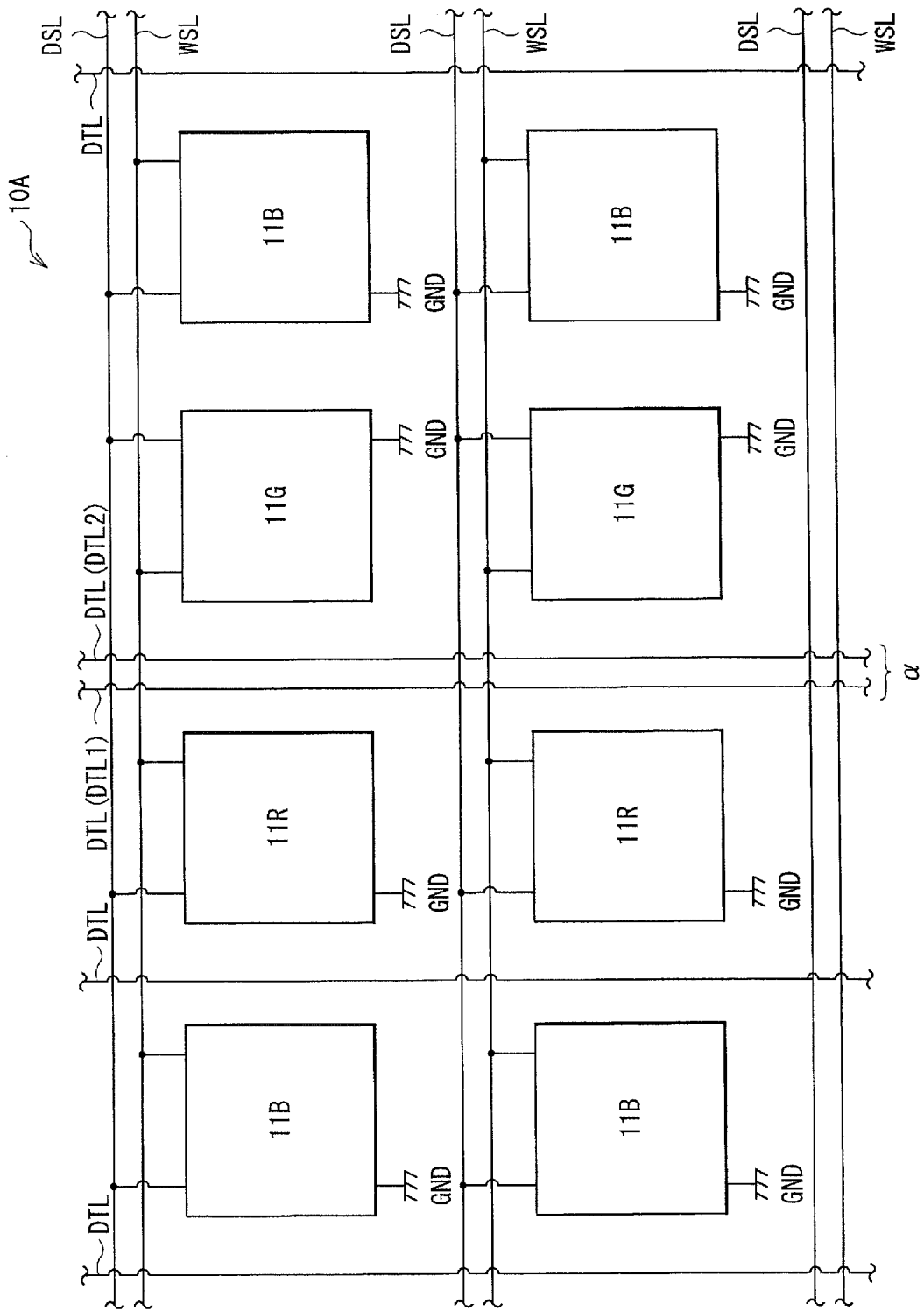
FIG. 4 is a diagram illustrating another layout example in the display region.

Next, a plane layout in the display panel 10 will be described with reference to FIG. 3 and FIG. 4. FIG. 3 illustrates an example of a plane layout in the display region 10A. FIG. 4 illustrates an example of a pixel arrangement in color display.

The plurality of pixels 11 are arranged, for example, in the row direction and the column direction in the display panel 10, as illustrated in FIG. 3. Each of the pixels 11 arranged in the row direction is connected to the common write line WSL, and is also connected to the common power line DSL. Each of the pixels 11 arranged in the column direction is connected to the common signal line DTL. The plurality of write lines WSL extending in the row direction are evenly spaced in the column direction. Similarly, the plurality of power lines DSL extending in the row direction are evenly spaced in the column direction.

Meanwhile, in the plurality of signal lines DTL extending in the column direction, the signal line DTL (for example, the signal line DTL2 in the figure) corresponding to a certain pixel column is disposed along other signal line DTL (for example, the signal line DTL1 in the figure) located next to this signal line DTL. In other words, the signal line DTL1 and the signal line DTL2 are both disposed in a common region a provided between the two pixels 11 next to each other. The display panel 10 is a panel performing the color display based on three primary colors of RGB. As illustrated in FIG. 4, for instance, when the pixel 11 (11R) corresponding to R, the pixel 11 (11G) corresponding to G, and the pixel 11 (11B) corresponding to B are arranged like stripes, the signal line DTL connected to the pixel 11R and the signal line DTL connected to the pixel 11G are disposed in the common region a provided between the pixel 11R and the pixel 11G.

In the two pixels 11 between which the two signal lines DTL1 and DTL2 are interposed, the plane layout of one of the pixels 11 is different from that of the other pixel 11. The plane layout of each of the pixels 11 connected to the signal line DTL2 is a layout corresponding to the position of the signal line DTL2, and is different from the plane layout of each of the pixels 11 connected to the signal line DTL1. Further, the plane layout of each of the pixels 11 connected to the signal line DTL2 is different from the plane layout of each of the pixels 11 disposed on both sides of this pixel 11.

For example, in the two pixels 11 between which the signal lines DTL1 and DTL2 are interposed, the plane layout of one of these pixels 11 is the reverse of the plane layout of the other pixel 11 with respect to the stripe-shaped region a serving as a symmetry axis. As illustrated in FIG. 3, for instance, the plane layout of each of the pixels 11 connected to the signal line DTL2 is the reverse of the plane layout of the pixel 11 connected to the signal line DTL1 with respect to the stripe-shaped region a serving as a symmetry axis. Further, the plane layout of each of the pixels 11 connected to the signal line DTL2 is the reverse of the plane layout of each of the pixels 11 disposed on both sides of this pixel 11 with respect to the stripe-shaped region a serving as a symmetry axis.

A distance D1 between the signal line DTL1 and the signal line DTL2, when the signal line DTL1 and the signal line DTL2 are viewed from the normal direction of the display region 10A, is, for example, substantially the same as the width of the signal line DTL2. The distance D1 is, for example, on the submicron order. It is to be noted that the distance D1 may be shorter than the width of the signal line DTL2, depending on a relative positional relationship between the signal line DTL1 and the signal line DTL2. Alternatively, the distance D1 being negative is also acceptable. Here, "the distance D1 being negative" indicates that the signal line DTL1 and the signal line DTL2 coincide partially or wholly with each other, when the signal line DTL1 and the signal line DTL2 are viewed from the normal direction of the display region 10A.

Next, a section layout in the display panel 10 will be described with reference to FIG. 5 to FIG. 7B. Each of FIG. 5 to FIG. 7B illustrates an example of a section layout of a part of the display panel 10, the part including the signal lines DTL. Specifically, FIG. 5 and FIG. 6 each illustrate an example of the section layout in the column direction, and FIGS. 7A and 7B each illustrate an example of the section layout in the row direction.

Figure 5:
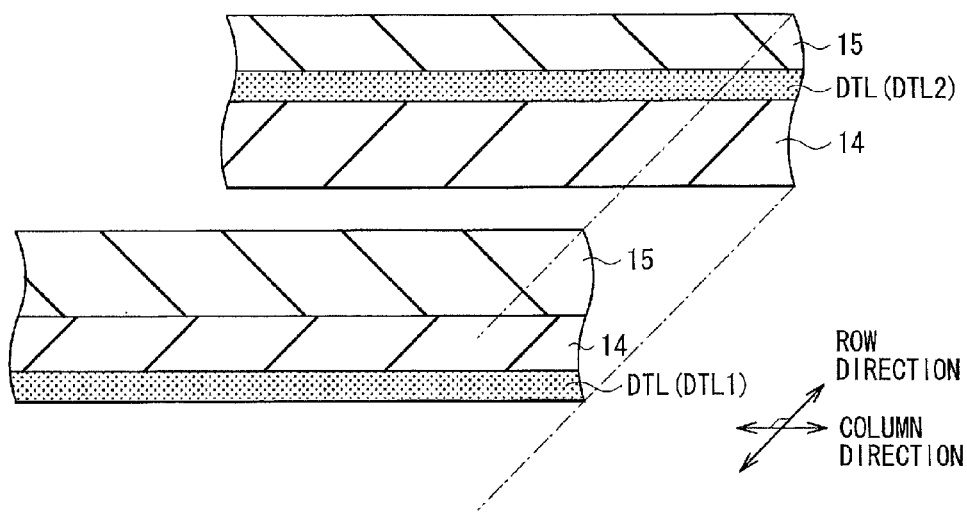
FIG. 5 is a diagram illustrating an example of a positional relationship between two wirings next to each other.

For example, as illustrated in FIG. 5, the signal line DTL1 is formed in an insulating layer 14, and the signal line DTL2 is formed in an insulating layer 15. The signal line DTL1 is formed in the insulating layer 14 which is equivalent to a layer relatively lower in position in relation to the insulating layer 15, and the signal line DTL2 is formed in the insulating layer 15 which is equivalent to a layer relatively higher in position in relation to the insulating layer 14. In other words, the two signal lines DTL1 and DTL2 are disposed in the layers different from each other in the display region 10A. Therefore, the section layout including the signal line DTL2 in the column direction is different from the section layout including the signal line DTL1 in the column direction. Here, the signal line DTL1 may be formed in the insulating layer 14 in the whole display region 10A, and the signal line DTL2 may be formed in the insulating layer 15 in the whole display region 10A.

Figure 6:
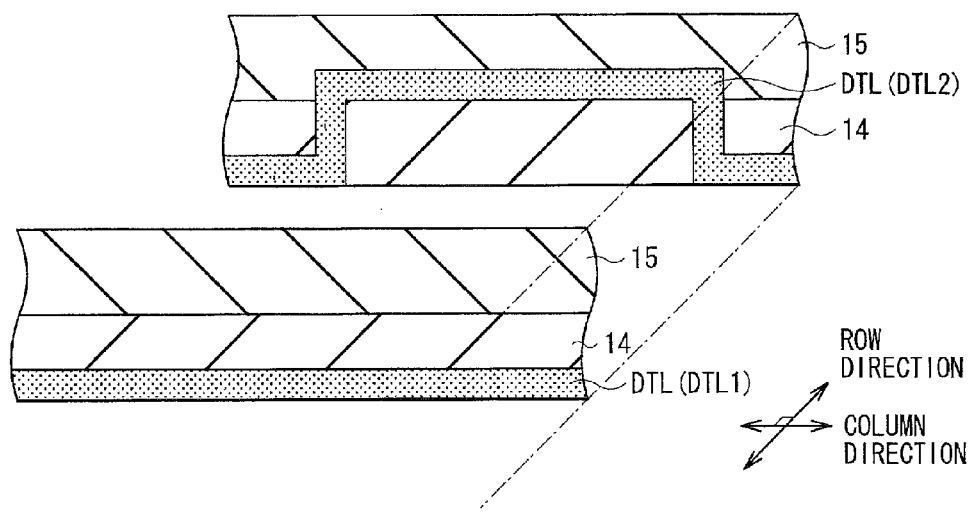
FIG. 6 is a diagram illustrating another example of a positional relationship between two wirings next to each other.

It is to be noted that, in the display region 10A, a part of the signal line DTL2 may be formed in an insulating layer (not illustrated) disposed above the insulating layer 15. In addition, for example, the signal line DTL2 may be formed in the insulating layer 14 in one segment and may be formed in the insulating layer 15 in other segment as illustrated in FIG. 6.

It is preferable that the two signal lines DTL1 and DTL2 be equal to each other in terms of interconnection length in the display region 10A. When the signal line DTL1 is formed in the insulating layer 14, and the signal line DTL2 is formed in the insulating layer 15, the two signal lines DTL1 and DTL2 are usually equal to each other in terms of interconnection length in the display region 10A. However, when at least a part of the signal line DTL2 is formed in the insulating layer disposed above the insulating layer 14 (e.g., the insulating layer 15) as described above, it is preferable that the section layout of the signal line DTL1 in the column direction be a layout formed by vertically reversing the section layout of the signal line DTL2 in the column direction, for example.

Figure 7A:
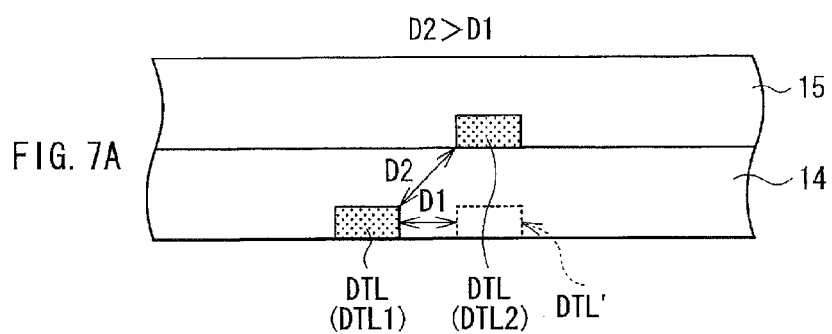
FIGS. 7A and 7B are diagrams each illustrating still another example of a positional relationship between two wirings next to each other.
Figure 7B:
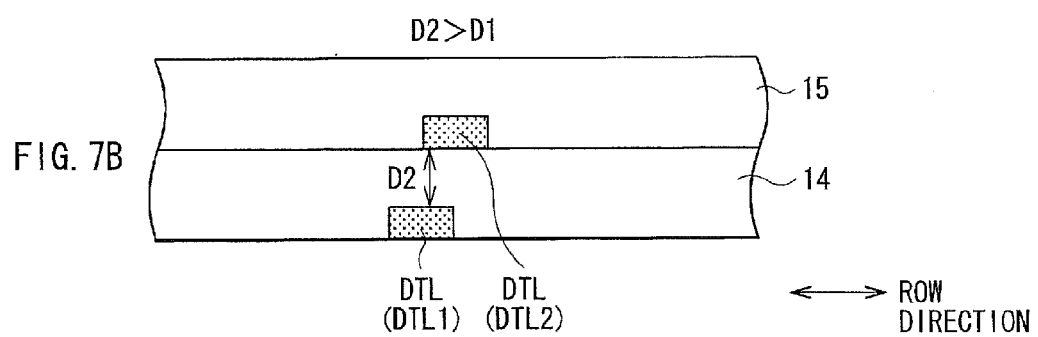

In either case, in the present embodiment, the distance between the two signal lines DTL1 and DTL2 is larger, at least in a part of each thereof, than that in a case where the two signal lines DTL1 and DTL2 are disposed in the same layer. Therefore, an actual distance D2 between the part of the signal line DTL2, the part being formed in the insulating layer disposed above the insulating layer 14 (e.g., the insulating layer 15), and the signal line DTL1 is larger than the distance D1, as illustrated in FIG. 7A, for example. A signal line DTL' in FIG. 7A indicates a position when the signal line DTL2 is brought down straight to the insulating layer 14.

It is to be noted that, as illustrated in FIG. 7A, for instance, when the signal line DTL1 and the part of the signal line DTL2, the part being formed in the layer above the signal line DTL1, are viewed from the normal direction of the display region 10A, the signal line DTL1 and the signal line DTL2 may coincide with each other partially or wholly.

(Drive Circuit 20)

Now, each circuit in the drive circuit 20 will be described with reference to FIG. 1. The timing generation circuit 21 controls the signal-line driving circuit 23, the write-line driving circuit 24, and the power-line driving circuit 25 so that these circuits operate together. For example, the timing generation circuit 21 outputs, to each of these circuits, a control signal 21A according to (in synchronization with) a synchronization signal 20B inputted from outside. For instance, the timing generation circuit 21 is formed on a control circuit substrate (not illustrated) independent of the display panel 10, together with, for example, the image-signal processing circuit 22, the signal-line driving circuit 23, the write-line driving circuit 24, the power-line driving circuit 25, and the like.

The image-signal processing circuit 22 performs, for instance, a predetermined correction on the image signal 20A in digital form inputted from outside. As the predetermined correction, a gamma correction, an overdrive correction, or the like may be used. Further, the image-signal processing circuit 22 converts, for example, the image signal 20A which has been subjected to the predetermined correction into an analog signal, according to (in synchronization with) a synchronization signal 20B inputted from outside. The image-signal processing circuit 22 then outputs the analog signal to the signal-line driving circuit 23, as an analog display signal 22A. In other words, the display signal 22A is a signal corresponding to the image signal 20A.

The signal-line driving circuit 23 outputs the display signal 22A inputted from the image-signal processing circuit 22, to each of the signal lines DTL, according to (in synchronization with) the input of the control signal 21A, and thereby performing writing in each of the selected pixels 11. It is to be noted that the "writing" indicates the application of a predetermined voltage to the gate of the drive transistor Tr1. The signal-line driving circuit 23 is, for example, capable of outputting a signal voltage Vsig corresponding to the display signal 22A, and a constant voltage Vofs irrelevant to the display signal 22A. Here, the voltage Vofs has a voltage value (a constant value) lower than a threshold voltage of the organic EL device 13.

The write-line driving circuit 24 sequentially applies a selection pulse to one or more of the write lines WSL, according to (in synchronization with) the input of the control signal 21A, thereby sequentially selecting one or more pixel rows. For example, the write-line driving circuit 24 is capable of outputting a voltage Von to be applied to turn on the write transistor Tr2 and a voltage Voff to be applied to turn off the write transistor Tr2.

The power-line driving circuit 25 sequentially applies a selection pulse to one or more of the power lines DSL, according to (in synchronization with) the input of the control signal 21A, thereby controlling emission and extinction of light of one or more pixel rows. For example, the power-line driving circuit 25 is capable of outputting a voltage VccH and a voltage VccL. The voltage VccH is applied at the time of a Vth correction and a μ correction which will be described later, as well as the emission of light. The voltage VccL is applied at the time of the extinction of light.

[Operation]

Figure 8:
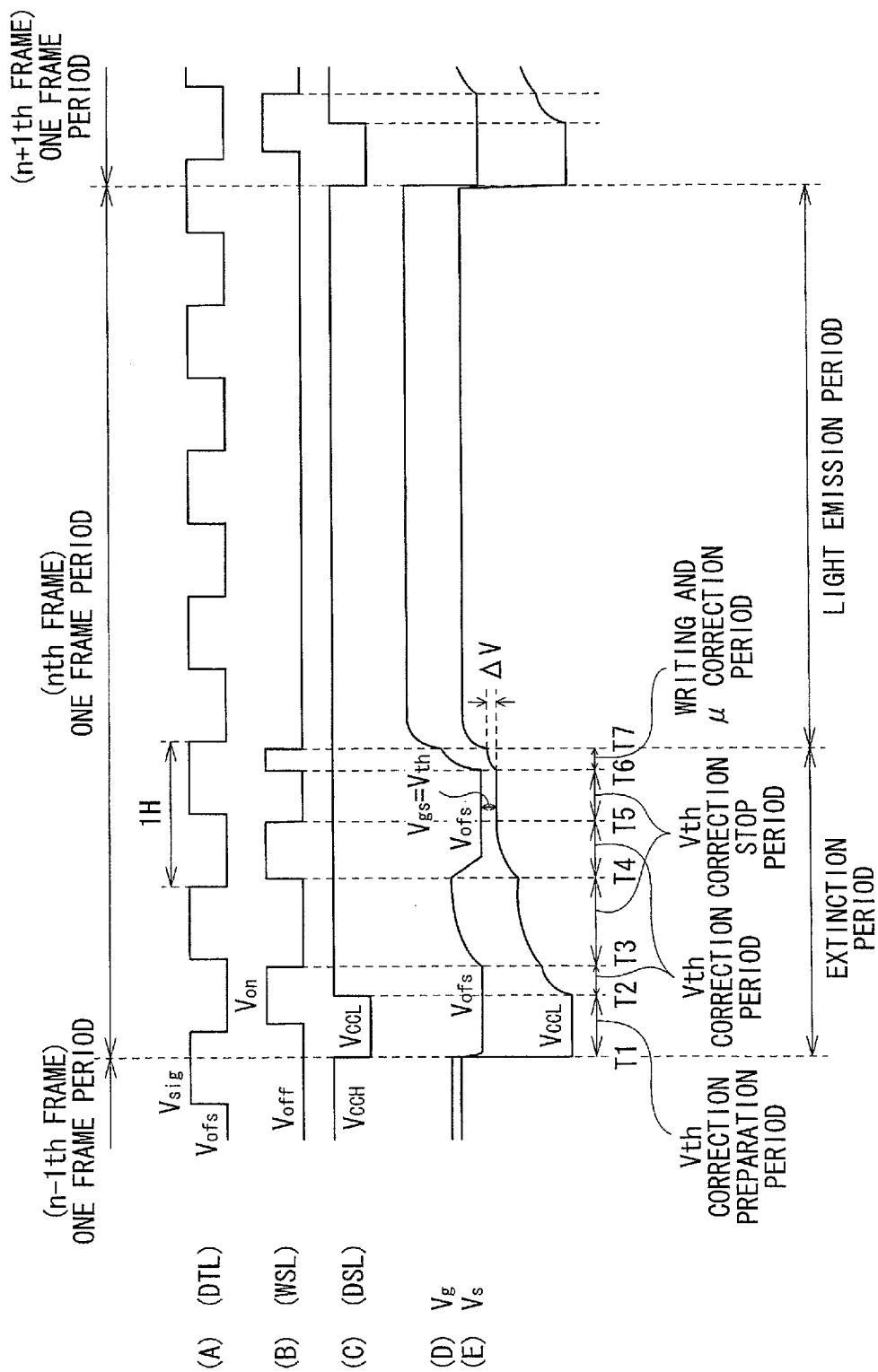
FIG. 8 is a diagram illustrating an example of how each of various voltages applied to a display panel changes with time, and an example of how each of a gate voltage and a source voltage of a drive transistor changes with time.

Next, an example of operation of the display unit 1 will be described. FIG. 8 illustrates an example of each of various waveforms at the time of driving the display unit 1. Part (A) of FIG. 8 illustrates a state in which the voltage Vsig and the voltage Vofs are periodically applied to the signal line DTL. Further, Part (B) of FIG. 8 illustrates a state in which the voltage Von and the voltage Voff are applied to the write line WSL based on predetermined timings. Furthermore, Part (C) of FIG. 8 illustrates a state in which the voltage VccH and the voltage VccL are applied to the power line DSL based on predetermined timings. It is to be noted that in Part (B) of FIG. 8, a waveform in a case where the drive transistor Tr1 is of an n-channel type is exemplified. Part (D) and Part (E) of FIG. 8 illustrate a state of a gate voltage Vg and a state of a source voltage Vs, respectively, of the drive transistor Tr1, which are changing every moment according to the application of the voltage to each of the signal line DTL, the write line WSL, and the power line DSL.

(Vth Correction Preparation Period)

First, preparations are made for the Vth correction (a threshold correction). Specifically, when the voltage of the write line WSL is Voff, and the voltage of the power line DSL is VccH (i.e. when the organic EL device 13 is emitting light), the power-line driving circuit 25 lowers the voltage of the power line DSL from VccH to VccL according to the control signal 21A (T1). Then, the source voltage Vs becomes VccL, and the organic EL device 13 stops emitting the light. Next, while the voltage of the power line DSL is VccL after the signal-line driving circuit 23 has switched the voltage of the signal line DTL from Vsig to Vofs according to the control signal 21A, the write-line driving circuit 24 increases the voltage of the write line WSL from Voff to Von according to the control signal 21A. Then, the gate voltage Vg becomes Vofs. At this moment, in the power-line driving circuit 25 and the signal-line driving circuit 23, the voltages (VccL and Vofs) to be applied to the power line DSL and the signal line DTL are set so that a potential difference Vgs (=Vofs−VccL) between the gate voltage Vg and the source voltage Vs is greater than a threshold voltage Vth of the drive transistor Tr1.

(First Vth Correction Period)

Next, the Vth correction is performed. Specifically, while the voltage of the signal line DTL is Vofs, the power-line driving circuit 25 increases the voltage of the power line DSL from VccL to VccH according to the control signal 21A (T2). Then, a current flows between the drain and the source of the drive transistor Tr1, and the source voltage Vs accordingly rises. The write-line driving circuit 24 then lowers the voltage of the write line WSL from Von to Voff according to the control signal 21A, before the signal-line driving circuit 23 switches the voltage of the signal line DTL from Vofs to Vsig according to the control signal 21A (T3). Then, the gate of the drive transistor Tr1 enters a floating state, and therefore the Vth correction is suppressed temporarily.

(First Vth Correction Stop Period)

During a period in which the Vth correction is stopped (i.e., while the voltage of the write line WSL is Voff and the voltage of the power line DSL is VccH), sampling of the voltage of the signal line DTL is performed in a row (pixels) different from the row (pixels) which has been subjected to the previous Vth correction. It is to be noted that when the Vth correction is insufficient, in other words, when the potential difference Vgs between the gate and the source of the drive transistor Tr1 is greater than the threshold voltage Vth of the drive transistor Tr1, the following occurs. That is, during the Vth correction stop period, the current also flows between the drain and the source of the drive transistor Tr1 in the row (pixels) which has been subjected to the previous Vth correction. Accordingly, the source voltage Vs rises, and also, the gate voltage Vg rises by coupling through the retention capacitor Cs.

(Second Vth Correction Period)

Upon ending of the Vth correction stop period, the Vth correction is performed again. Specifically, at the time when the voltage of the power line DSL is VccH; the voltage of the signal line DTL is Vofs; and the Vth correction is possible, the write-line driving circuit 24 increases the voltage of the write line WSL from Voff to Von according to the control signal 21A (T4), and connects the gate of the drive transistor Tr1 to the signal line DTL. At this moment, when the source voltage Vs is lower than Vofs−Vth (i.e. when the Vth correction is not yet completed), the current flows between the drain and the source of the drive transistor Tr1 until the drive transistor Tr1 is cut off (until the potential difference Vgs becomes Vth). Accordingly, the gate voltage Vg becomes Vofs, and the source voltage Vs rises. As a result, the retention capacitor Cs is charged to Vth, and the potential difference Vgs becomes Vth. Subsequently, before the signal-line driving circuit 23 switches the voltage of the signal line DTL from Vofs to Vsig, the write-line driving circuit 24 lowers the voltage of the write line WSL from Von to Voff (T5). Then, the gate of the drive transistor Tr1 enters a floating state, which allows the potential difference Vgs to be maintained at Vth regardless of the magnitude of the voltage at the signal line DTL. By thus setting the potential difference Vgs at Vth, it is possible to eliminate variations in light emission intensity among the organic EL devices 13 even when the threshold voltages Vth of the drive transistors Tr1 vary among the pixel circuits 12.

(Second Vth Correction Stop Period)

After that, during the Vth correction stop period (i.e. while the voltage of the write line WSL is Voff and the voltage of the power line DSL is VccH), the signal-line driving circuit 23 switches the voltage of the signal line DTL from Vofs to Vsig according to the control signal 21A.

(Writing and μ Correction Period)

Upon ending of the second Vth correction stop period, writing and the μ correction are performed. Specifically, while the voltage of the signal line DTL is Vsig, the write-line driving circuit 24 increases the voltage of the write line WSL from Voff to Von according to the control signal 21A (T6), and connects the gate of the drive transistor Tr1 to the signal line DTL. Then, the voltage of the gate of the drive transistor Tr1 becomes the voltage Vsig of the signal line DTL. At this moment, an anode voltage of the organic EL device 13 is still smaller than the threshold voltage of the organic EL device 13 in this stage, and the organic EL device 13 is cut off. Therefore, the current flows in a device capacity (not illustrated) of the organic EL device 13, and the device capacity is charged. Thus, the source voltage Vs rises by only ΔV, and the potential difference Vgs soon becomes Vsig+Vth−ΔV. In this way, the μ correction is performed simultaneously with the writing. Here, the larger the mobility μ of the drive transistor Tr1 is, the greater the ΔV is. Therefore, a variation in the mobility μ for each of the pixels is allowed to be removed by reducing the potential difference Vgs by only ΔV before the emission of light.

(Light Emission Period)

Next, the write-line driving circuit 24 lowers the voltage of the write line WSL from Von to Voff according to the control signal 21A (T7). The gate of the drive transistor Tr1 then enters a floating state, and the current accordingly flows between the drain and the source of the drive transistor Tr1, and the source voltage Vs rises. As a result, the voltage equal to or greater than the threshold voltage is applied to the organic EL device 13, and the organic EL device 13 emits the light of a desired luminance.

[Effects]

Now, effects of the display unit 1 of the present embodiment will be described.

Figure 9:
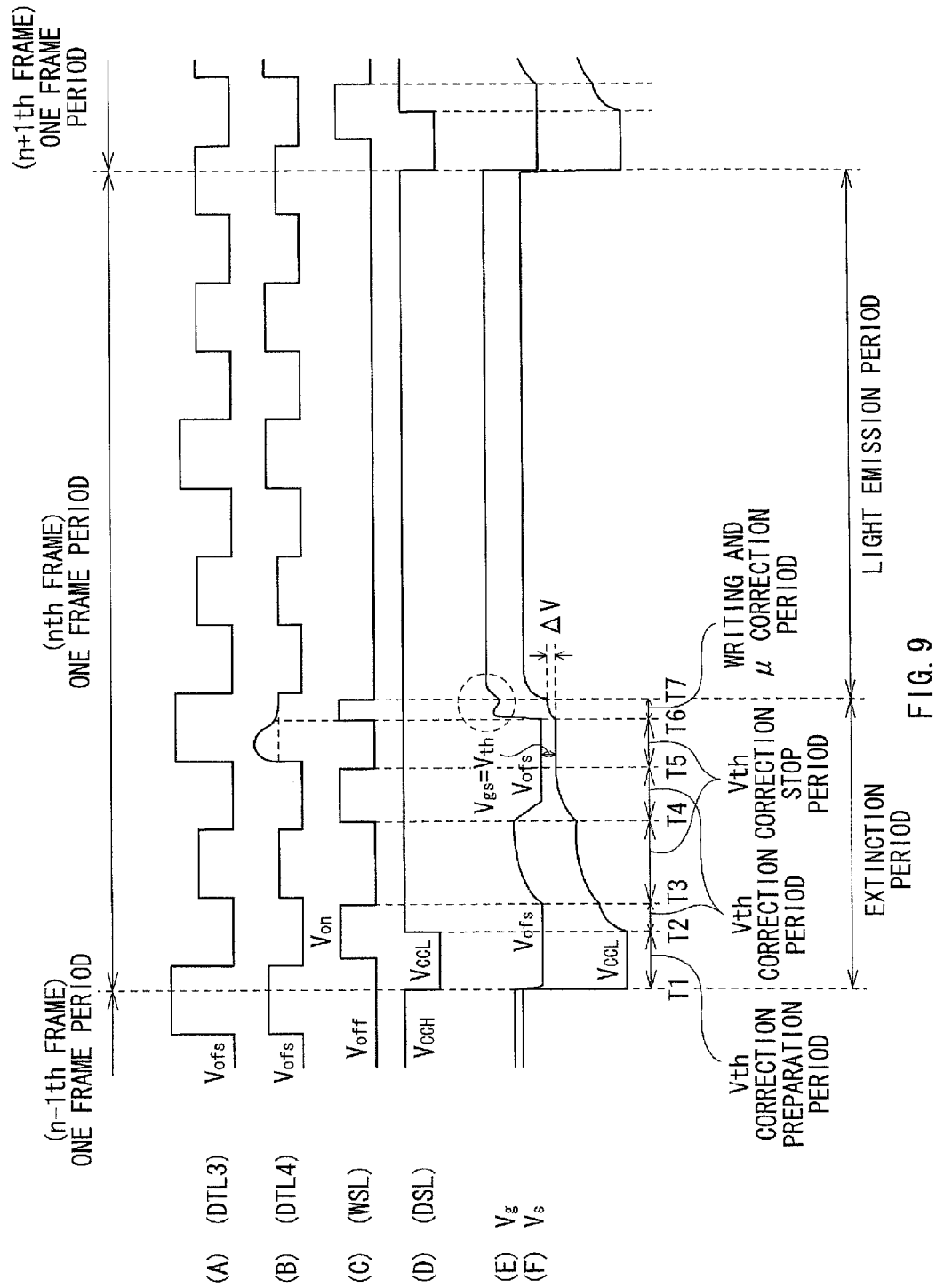
FIG. 9 is a diagram illustrating an example of how each of various voltages applied to a display panel changes with time, and an example of how each of a gate voltage and a source voltage of a drive transistor changes with time, according to a comparative example.

FIG. 9 illustrates an example of each of various waveforms at the time when a signal line DTL3 connected to a certain pixel 11 drives a display panel (a display panel according to a comparative example) disposed along a signal line DTL4 connected to a pixel 11 next to this certain pixel 11. Suppose when this display panel according to the comparative example is being driven, a certain pixel row enters a Vth correction stop period (between T5 and T6) equivalent to a period immediately before a writing and μ correction period. Assume that, at this moment, for example, a voltage of the signal line DTL3 becomes significantly greater than a voltage of the signal line DTL4, as illustrated in FIG. 9. In that case, due to coupling by a parasitic capacitance between the signal line DTL3 and the signal line DTL4, the voltage of the signal line DTL4 is affected by the voltage of the signal line DTL3, thereby deviating from a desired value (indicated with a broken line in the drawing) as illustrated in FIG. 9. As a result, a waveform surrounded by a circle indicated with a broken line in FIG. 9 is formed, making it difficult to perform the μ correction correctly.

Figure 10:
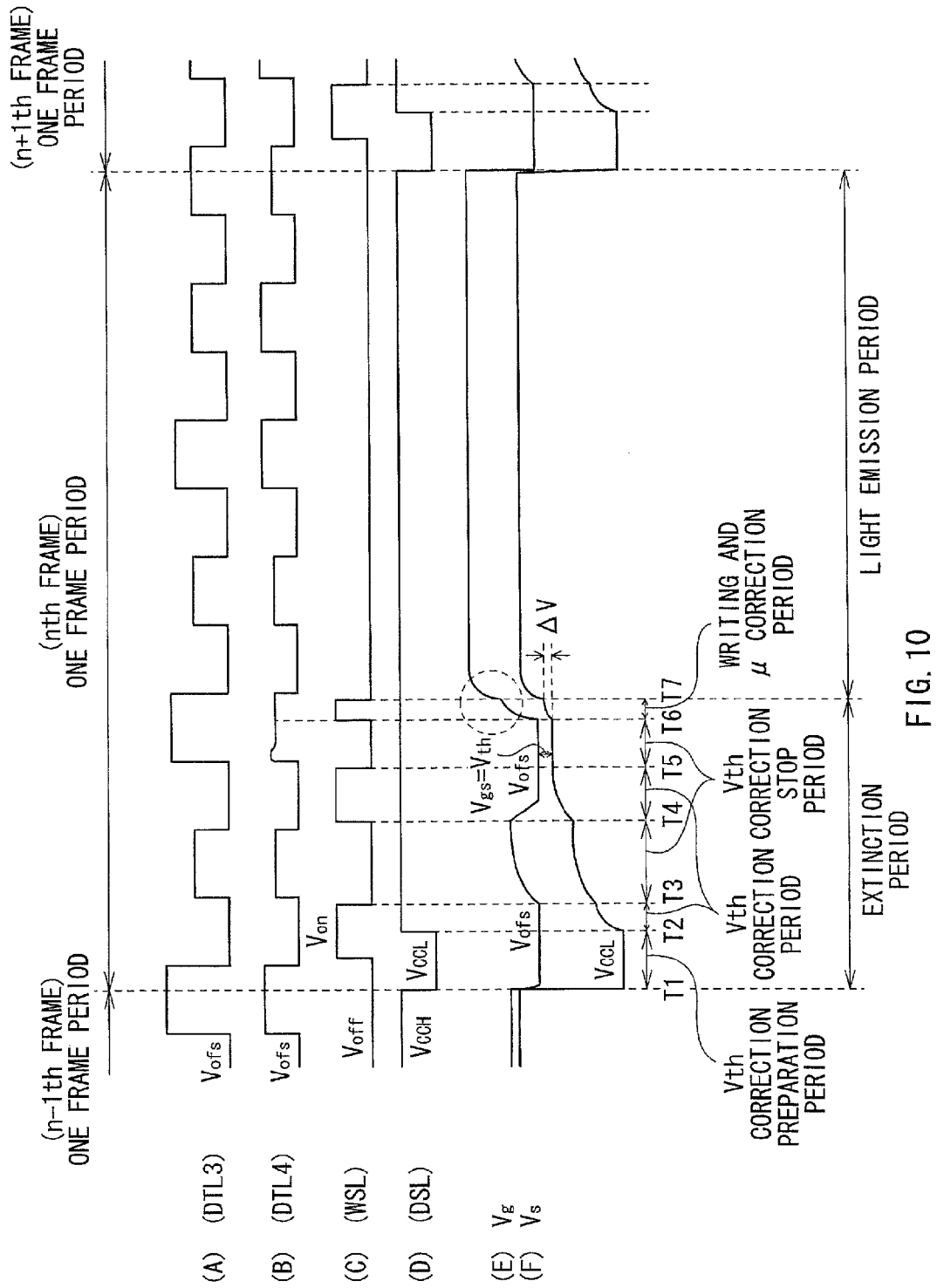
FIG. 10 is a diagram illustrating another example of how each of various voltages applied to the display panel changes with time, and another example of how each of the gate voltage and the source voltage of the drive transistor changes with time.

In the present embodiment, in contrast, the layouts of the signal line DTL1 and the signal line DTL2 in the thickness direction are different from each other at least in a part of each thereof. Therefore, as illustrated in FIG. 10, even when the voltage of the signal line DTL1 is significantly greater than the voltage of the signal line DTL2, the parasitic capacitance between the signal line DTL1 and the signal line DTL2 is small, and coupling by the parasitic capacitance is suppressed. As a result, the voltage of the signal line DTL2 is prevented from being affected by the voltage of the signal line DTL1 and thus, the μ correction is allowed to be performed correctly as indicated with a circle of a broken line in FIG. 10. Therefore, suppression of crosstalk (color mixture) is allowed. Further, a reduction in the parasitic capacitance of the signal line DTL is enabled and thus, an increase in discharge and charge of electric power is allowed to be suppressed.

2. Application Examples

Application examples of the display unit 1 according to the embodiment will be described below. The display unit 1 is applicable to display units of electronic units in all fields, which display externally-inputted image signals or internally-generated image signals as still or moving images. The electronic units include, for example, television receivers, digital cameras, laptop computers, portable terminals such as portable telephones, video cameras, and the like.

(Module)

Figure 11:
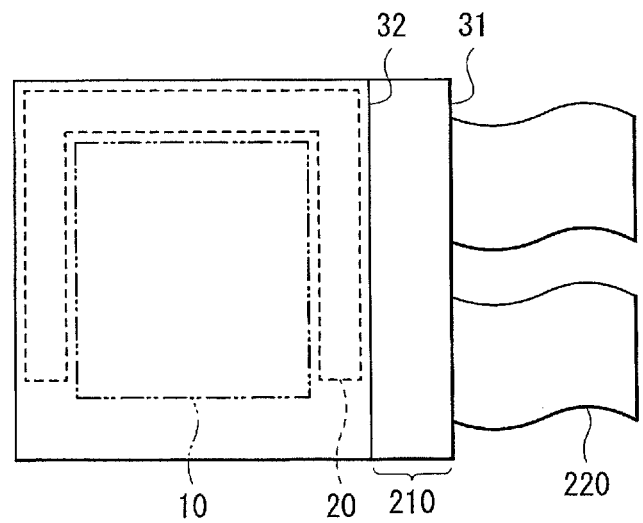
FIG. 11 is a plan view illustrating a schematic configuration of a module including the display unit of the embodiment.

The display unit 1 is incorporated, for instance, as a module illustrated in FIG. 11, into any of various kinds of electronic units such as application examples 1 to 5 which will be described later. This module is formed, for example, by providing a region 210 exposed from a sealing substrate 32 at one side of a substrate 31. In this exposed region 210, an external connection terminal (not illustrated) is formed by extending wiring of the drive circuit 20. The external connection terminal may be provided with a flexible printed circuit (FPC) 220 for input and output of signals.

Application Example 1

Figure 12:
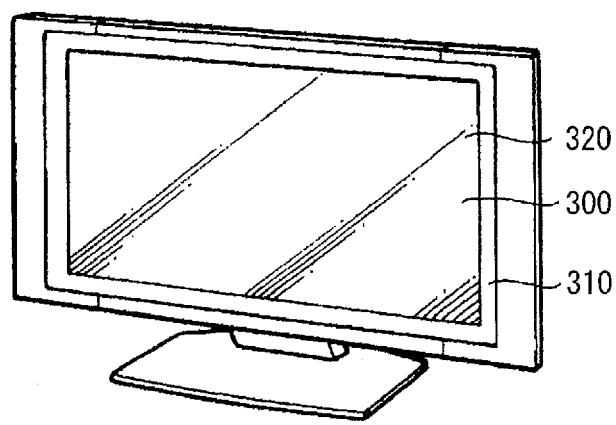
FIG. 12 is a perspective diagram illustrating an appearance of an application example 1 to which the display unit of the embodiment is applied.

FIG. 12 illustrates an appearance of a television receiver to which the display unit 1 is applied. This television receiver has, for example, an image-display screen section 300 that includes a front panel 310 and a filter glass 320. The image-display screen section 330 is configured using the display unit 1.

Application Example 2

Figure 13A:
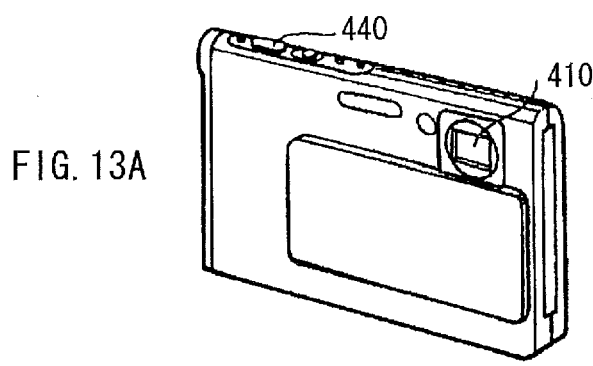
FIG. 13A and FIG. 13B are perspective diagrams each illustrating an appearance of an application example 2, namely, the appearance when viewed from front, and the appearance when viewed from back, respectively.
Figure 13B:
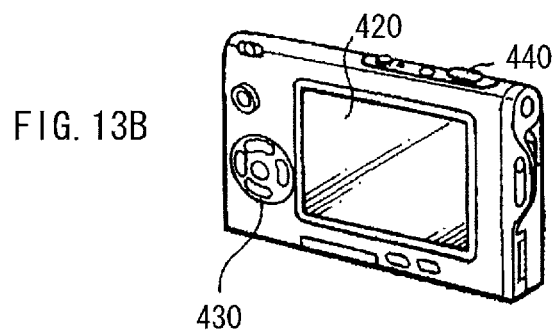

FIGS. 13A and 13B each illustrate an appearance of a digital camera to which the display unit 1 is applied. This digital camera includes, for example, a flash emitting section

410, a display section 420, a menu switch 430, and a shutter release 440. The display section 420 is configured using the display unit 1.

Application Example 3

Figure 14:
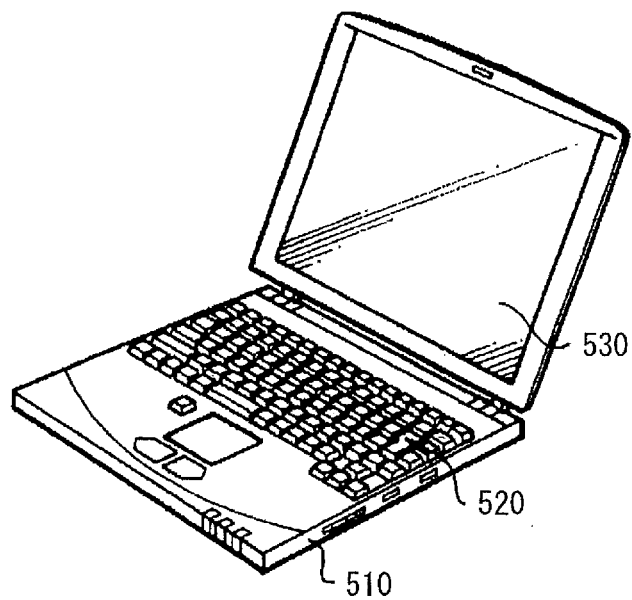
FIG. 14 is a perspective diagram illustrating an appearance of an application example 3.

FIG. 14 illustrates an appearance of a laptop computer to which the display unit 1 is applied. This laptop computer includes, for example, a main body section 510, a keyboard 520 provided to enter characters and the like, and a display section 530 displaying an image. The display section 530 is configured using the display unit 1.

Application Example 4

Figure 15:
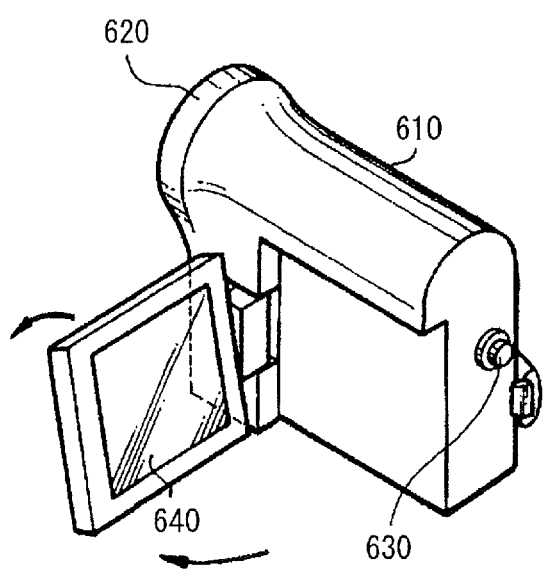
FIG. 15 is a perspective diagram illustrating an appearance of an application example 4.

FIG. 15 illustrates an appearance of a video camera to which the display unit 1 is applied. This video camera includes, for example, a main body section 610, a lens 620 disposed on a front face of this main body section 610 to shoot an image of a subject, a start/stop switch 630 used in shooting, and a display section 640. The display section 640 is configured using the display unit 1.

Application Example 5

FIGS. 16A to 16G each illustrate an appearance of a portable telephone to which the display unit 1 is applied. This portable telephone is, for example, a unit in which an upper housing 710 and a lower housing 720 are connected by a coupling section (a hinge section) 730, and includes a display 740, a sub-display 750, a picture light 760, and a camera 770. The display 740 or the sub-display 750 is configured using the display unit 1.

The technology has been described with reference to the embodiment and the application examples, but is not limited thereto and may be variously modified.

For example, in the embodiment and the like, the case where the signal lines DTL in proximity to one another has been described as an example. However, as a matter of course, the technology is also applicable to a case where the write lines WSL are in proximity to one another and a case where the power lines DSL are in proximity to one another.

Further, for example, in the embodiment and the like, the case where the display unit 1 is of the active matrix type has been described. However, the configuration of the pixel circuit 12 for active matrix driving is not limited to those of the embodiment and the like. A capacitive device and a transistor may be added to the pixel circuit 12 as necessary. In this case, in addition to the signal-line driving circuit 23, the write-line driving circuit 24, and the power-line driving circuit 25, a necessary drive circuit may be provided according to a modification made to the pixel circuit 12.

Furthermore, for example, in the embodiment and the like, the timing generation circuit 21 controls the driving of each of the image-signal processing circuit 22, the signal-line driving circuit 23, the write-line driving circuit 24, and the power-line driving circuit 25. However, the driving of these circuits may be controlled by other circuit. Moreover, the image-signal processing circuit 22, the signal-line driving circuit 23, the write-line driving circuit 24, and the power-line driving circuit 25 may be controlled by hardware (a circuit), or may be controlled by software (a program).

Moreover, for example, the present technology may be configured as follows.

(1) A display panel including:
a plurality of first wirings extending in a row direction;
a plurality of second wirings extending in a column direction; and
a plurality of pixels each arranged in proximity to an intersection of each of the first wirings and each of the second wirings,
wherein two wirings of the plurality of first wirings or two wirings of the plurality of second wirings are disposed in a common region interposed between two pixels next to each other, and layouts of the respective two wirings in a thickness direction are different from each other at least in a part of each of the layouts.

(2) The display panel according to (1), wherein the two wirings are disposed in respective layers different from each other, in a display region of the display panel.

(3) The display panel according to (1) or (2), wherein each of the two wirings is a signal line to which a signal according to an image signal is applied.

(4) The display panel according to any one of (1) to (3), wherein interconnection lengths of the respective two wirings are equal to each other.

(5) The display panel according to any one of (1) to (4), wherein in the two pixels between which the two wirings are interposed, a layout of one of the two pixels is a reverse of a layout of the other pixel.

(6) A display unit including:
a display panel including a plurality of first wirings extending in a row direction, a plurality of second wirings extending in a column direction, and a plurality of pixels each arranged in proximity to an intersection of each of the first wirings and each of the second wirings; and
a drive circuit driving each of the pixels through the plurality of first wirings and the plurality of second wirings,
wherein two wirings of the plurality of first wirings or two wirings of the plurality of second wirings are disposed in a common region interposed between two pixels next to each other, and layouts of the respective two wirings in a thickness direction are different from each other at least in a part of each of the layouts.

(7) An electronic unit including a display unit, the display unit including:
a display panel including a plurality of first wirings extending in a row direction, a plurality of second wirings extending in a column direction, and a plurality of pixels each arranged in proximity to an intersection of each of the first wirings and each of the second wirings; and
a drive circuit driving each of the pixels through the plurality of first wirings and the plurality of second wirings,
wherein two wirings of the plurality of first wirings or two wirings of the plurality of second wirings are disposed in a common region interposed between two pixels next to each other, and layouts of the respective two wirings in a thickness direction are different from each other at least in a part of each of the layouts.

The disclosure contains subject matter related to that disclosed in Japanese Priority Patent Application JP 2011-237487 filed in the Japan Patent Office on Oct. 28, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display panel comprising:
a substrate;
a plurality of first wirings formed on the substrate extending in a row direction;
a plurality of second wirings formed on the substrate extending in a column direction; and
a plurality of pixels formed on the substrate and respectively arranged in proximity to intersections of the first wirings and the second wirings,
wherein two wirings of the plurality of first wirings or two wirings of the plurality of second wirings are disposed in a common region interposed between two pixels next to each other, and layouts of the respective two wirings in a thickness direction are different from each other at least in a part of each of the layouts, the thickness direction being orthogonal to the row and column directions, and wherein the two wirings of the plurality of first wirings or the two wirings of the plurality of second wirings are disposed in respective layers different from each other, in a display region of the display panel.

2. The display panel according to claim 1, wherein each of the two wirings is a signal line to which a signal according to an image signal is applied.

3. The display panel according to claim 1, wherein interconnection lengths of the respective two wirings are equal to each other.

4. The display panel according to claim 1, wherein in the two pixels between which the two wirings are interposed, a layout of one of the two pixels is a reverse of a layout of the other pixel.

5. The display panel of claim 1,
wherein the two wirings that are disposed in the common region are separated from each other by a minimum distance D2, where D2 is greater than a width of one of the two wirings that are disposed in the common region.

6. The display panel of claim 1,
wherein the two wirings that are disposed in the common region include a wiring A and a wiring B, and the wiring A and the wiring B are disposed in the same layer as each other in at least one portion of a display region of the display panel and are disposed in different layers than each other in at least one other portion of the display region.

7. The display panel of claim 6,
wherein interconnection lengths of the respective two wirings are equal to each other.

8. A display unit comprising:
a display panel including a substrate, a plurality of first wirings formed on the substrate extending in a row direction, a plurality of second wirings formed on the substrate extending in a column direction, and a plurality of pixels formed on the substrate and respectively arranged in proximity to intersections of the first wirings and the second wirings; and
a drive circuit driving each of the pixels through the plurality of first wirings and the plurality of second wirings,
wherein two wirings of the plurality of first wirings or two wirings of the plurality of second wirings are disposed in a common region interposed between two pixels next to each other, and layouts of the respective two wirings in a thickness direction are different from each other at least in a part of each of the layouts, where the thickness direction is orthogonal to the row and column directions, and
wherein the two wirings of the plurality of first wirings or the two wirings of the plurality of second wirings are disposed in respective layers different from each other, in a display region of the display panel.

9. An electronic unit including a display unit, the display unit comprising:
a display panel including a substrate, a plurality of first wirings formed on the substrate extending in a row direction, a plurality of second wirings formed on the substrate extending in a column direction, and a plurality of pixels formed on the substrate and respectively arranged in proximity to intersections of the first wirings and the second wirings; and
a drive circuit driving each of the pixels through the plurality of first wirings and the plurality of second wirings,
wherein two wirings of the plurality of first wirings or two wirings of the plurality of second wirings are disposed in a common region interposed between two pixels next to each other, and layouts of the respective two wirings in a thickness direction are different from each other at least in a part of each of the layouts, where the thickness direction is orthogonal to the row and column directions, and
wherein the two wirings of the plurality of first wirings or the two wirings of the plurality of second wirings are disposed in respective layers different from each other, in a display region of the display panel.

10. A display panel comprising:
a substrate;
a plurality of pixels formed on the substrate including a plurality of red pixels configured to emit red light and a plurality of green pixels configured to emit green light;
a plurality of first signal lines formed on the substrate extending in a first direction configured to supply first image signals to red pixels;
a plurality of second signal lines formed on the substrate extending in the first direction configured to supply second image signals to green pixels; and
a plurality of write lines formed on the substrate extending in a second direction configured to supply a voltage to turn on the plurality of pixels,
wherein the plurality of pixels formed on the substrate and respectively arranged in proximity to intersections of the write lines and one of the first signal lines or the second signal lines,
wherein one of the plurality of first signal lines and one of the plurality of second signal lines are adjacent to each other and closer than a pitch of the plurality of pixels in a row direction in a plan view,
the one of the plurality of first signal lines is arranged in a first layer, and
the one of the plurality of second signal lines is arranged in a second layer different than the first layer in a cross section.

11. A display panel comprising:
a substrate;
a plurality of pixels formed on the substrate and including a plurality of first pixels configured to emit light of a first color and a plurality of second pixels configured to emit light of a second color which is different with the first color;
a plurality of first signal lines formed on the substrate and electrically connected to the first pixels;
a plurality of second signal lines formed on the substrate and electrically connected to the second pixels;
a first insulating layer formed on the substrate, and a second insulating layer formed on the substrate and above the first insulating layer;
a plurality of write lines formed on the substrate electrically connected to the plurality of pixels,
wherein the plurality of pixels formed on the substrate and respectively arranged in proximity to intersections of the write lines and one of the first signal lines or the second signal lines,
wherein
a first wiring segment, which is part of one of the plurality of first signal lines, is arranged in the first insulating layer, the first wiring segment extending in a direction parallel to the substrate and not being an interlayer connection, and a second wiring segment, which is part of one of the plurality of second signal lines, is arranged in the second insulating layer.

12. The display panel according to claim 11, wherein the first wiring segment and the second wiring segment are adjacent to each other.

13. The display panel according to claim 12, wherein
one of the plurality of first pixels and one of the plurality of second pixels include a first transistor, a second transistor, and an organic EL device, respectively,
the one of the plurality of first signal lines is connected to the first transistor of the one of the plurality of first pixels, and
the one of the plurality of second signal lines is connected to the first transistor of the one of the plurality of second pixels.

14. The display panel according to claim 13, wherein a distance between the first wiring segment and the second wiring segment is lower than a distance between the first transistor of the one of the plurality of first pixels and the first transistor of the one of the plurality of second pixels in a row direction in a plan view.

* * * * *